Nov. 27, 1956 R. W. POOLEY 2,772,196
SHOE SOLE AND METHOD OF MAKING SAME
Filed May 21, 1954
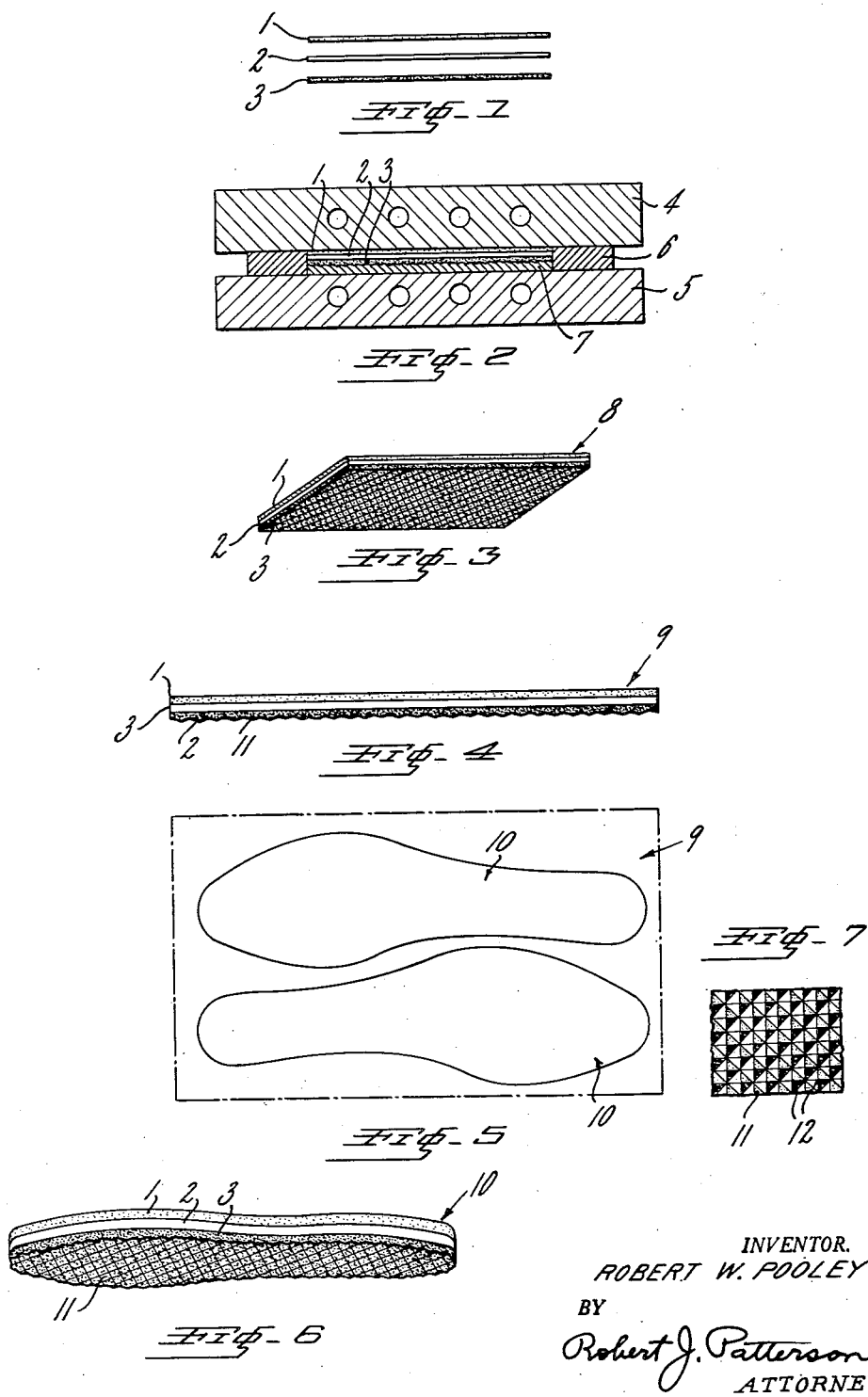
INVENTOR.
ROBERT W. POOLEY
BY
Robert J. Patterson
ATTORNEY

United States Patent Office 2,772,196
Patented Nov. 27, 1956

2,772,196

SHOE SOLE AND METHOD OF MAKING SAME

Robert W. Pooley, South Bend, Ind., assignor to United States Rubber Company, New York, N. Y., a corporation of New Jersey Application May 21, 1954, Serial No. 431,479

10 Claims. (Cl. 154—106)

This invention relates to a multi-colored, flexible, resilient laminate made of a closed-cell, expanded, vulcanized, fused mixture of a thermoplastic vinyl resin, a high-boiling organic liquid plasticizer therefor and a butadiene-acrylonitrile rubbery copolymer. The laminate of my invention is particularly characterized by the sharpness of the lines of demarcation of differently colored layers and by the fact that these differently colored layers are integrally bonded together during manufacture without the use of any cement or solvent which would add to the expense and cause trouble with delamination. In accordance with my invention integral bonding of adjacent layers is achieved as a result of fusion of the mixture and vulcanization of the rubbery copolymer during processing which cause sufficient coalescence of the material of the adjacent layers with each other at the interfaces to effect a strong integral bond but insufficiently to cause merger to such an extent as to form interfacial zones of appreciable thickness. Actually in spite of the integral bond, the lines of separation of the adjacent layers in the finished laminate are so narrow that they present no width to the unaided human eye. Furthermore, in spite of merger at the interface to a degree sufficient to give a truly integral bond, the lines of demarcation are perfectly sharp and straight which adds greatly to the sales appeal.

My invention is particularly applicable to the manufacture of the laminate described above in sheet form with the layers of the differently colored stocks extending parallel to the faces of the sheet. Such a sheet can readily be made with a roughened face on one side whereby by cutting the sheet transversely to the differently colored laminations there can be obtained shoe soles having a most attractive edge characterized by the sharpness and straightness of the stripes exposed in the cutting operation.

The principal object of my invention is to provide a new laminate which does not require the use of cement, solvent or other special technique to secure bonding of the several laminae together. Another object is to provide a laminate of a closed-cell, flexible, resilient, expanded composition of matter which is especially characterized by the straightness and sharpness of the lines of demarcation visible at the exposed edges of the laminate when it is cut transversely of the laminae into any desired articles, especially shoe soles which can be made into attractive sandals by application of straps or other fastening means. Another object is to provide a highly attractive and useful shoe soling material and shoe soles made therefrom by a simple dieing-out operation. Another object is to provide a novel method for the manufacture of the aforementioned new articles of manufacture. Numerous other objects will more fully hereinafter appear.

In the accompanying drawings, which portray one method of making the multi-colored laminate of my invention, Fig. 1 portrays the layers of differently colored sheeted stock before the pre-molding step;

Fig. 2 portrays the pre-molding step;

Fig. 3 is a perspective of the miniature laminated pre-molded sheet produced in Fig. 2;

Fig. 4 is an edge view of the final expanded and cured sheet;

Fig. 5 is a plan view of the sheet indicating cuts defining soles made therefrom;

Fig. 6 is a perspective of a finished sole; and

Fig. 7 is an enlarged plan view of a portion of a typical tread design.

My invention is based upon the discovery that a very useful and highly attractive article of manufacture can be made by forming a plurality of differently colored mixtures of a solid, shapable, non-sticky dispersion of a thermoplastic vinyl resin and a high-boiling organic liquid plasticizer therefor in a butadiene-acrylonitrile rubbery copolymer as the continuous phase, which mixtures include pigmenting material, a chemical blowing agent, and vulcanizing agents for the rubbery copolymer, sheeting out these mixtures, plying up layers of the differently colored sheets with differently colored layers adjacent to one another, and thereafter heating the plied-up assembly and effecting decomposition of the blowing agent and expansion of the mixture to closed-cell cellular form, fusion of the resin, plasticizer and rubbery copolymer into a uniform homogeneous blend, vulcanization of the rubbery copolymer and integral bonding of contiguous layers to each other at the interfaces, whereby there is formed a laminated article comprising a plurality of parallel differently colored closed-cell expanded layers integrally bonded together at their interfaces with sharp straight lines of demarcation therebetween. In the preferred embodiment of my invention the thickness and number of the sheets originally plied up are such that the final sheet has a thickness suitable for shoe soling.

A typical method of making the multi-colored laminate of my invention comprises pre-molding under heat and confining positive mechanical pressure a plied-up assembly of differently colored layers of a thermoplastic vinyl resin, a high-boiling organic liquid plasticizer therefor and a butadiene-acrylonitrile rubbery copolymer, the latter being in the continuous phase, each mixture also containing a chemical blowing agent and vulcanizing ingredients for the copolymer, whereby the chemical blowing agent is decomposed, the resin, plasticizer and rubbery copolymer are fused to a homogenous, single phase material, and the copolymer is partly vulcanized sufficiently to retain the evolved gas during the remaining steps of the process but insufficiently to prevent final expansion of the mixture, cooling the mixture while maintaining the confining positive mechanical pressure thereupon, removing the mixture from the pre-molding press, and heating the resulting miniature shape under conditions of free expansion to expand it to final form by means of the gas which was evolved during the pre-molding step and to complete the cure of the rubbery copolymer.

My invention is based upon the discovery that when differently colored layers of stock are treated in the foregoing manner they bond together integrally during the processing by which the expansion and curing are performed and form sharp straight lines of demarcation between differently colored adjacent layers whereby there is obtained a laminated expanded article in which the differently colored layers are integrally bonded to one another without migration of the differently colored stock into one another in such a way as to destroy the sharpness of delineation and whereby distortion of the layers during processing is prevented. The result is that in the final article the differently colored layers are sharply differentiated from each other along planes which are perfectly planar or flat so that upon cutting the laminate at an angle to the laminae thereof along any line therein a most attractive striped surface is revealed.

Upon cutting the resulting laminated article at an angle to the planes of the different colored layers which compose it, there is obtained an unusually attractive striped surface which is characterized by the sharpness with which the stripes of differently colored layers present themselves to the eye. The cutting of the final expanded cured article can be done at right angles to the laminae or at any other desired angle. Usually the cutting is done at right angles.

By making a flat sheet of stock in the manner described above with the laminae running parallel to the planar surfaces of the sheet and by dieing-out pieces thereof having the shape of a shoe sole, there is obtained an exceedingly attractive shoe sole to which straps or any other suitable foot-attaching structure can be secured to form a sandal or other article of foot wear. Such shoe soles have great eye appeal and have found a ready market because of the unusually sharp manner in which the differently colored stripes of expanded stock are manifested at the edge. These shoe soles are comfortable to the wearer because of their compressibility and flexibility which cause them to conform comfortably to the contour of the foot and to reduce the shock of impact with the ground. They have a true cushioning nature. In the preferred embodiment, they have a smooth upper surface for greater foot comfort and a roughened tread base, the latter being imparted in any suitable way as by having one face of the mold, in which the aforementioned pre-molding is performed, engraved with any desired non-skid tread pattern in miniature. Such a tread pattern prevents undue slipping on wet surfaces.

In practicing my invention, I much prefer to form the initial mixtures in accordance with the teachings of U. S. patent to Daly et al., 2,570,182, issued October 9, 1951, in accordance with which I disperse an unfused mixture of a thermoplastic vinyl resin and a high-boiling organic liquid plasticizer therefor which is substantially a nonsolvent for the resin at ordinary temperature but is capable of dissolving the same upon heating to an elevated temperature, in a butadiene-acrylonitrile rubbery copolymer as the continuous phase. Several different batches, depending upon the number of colors desired in the final article, are prepared, each being differently pigmented. Each of the batches contains a chemical blowing agent and vulcanizing agents for the copolymer. These mixtures are dry and moldable and free from the stickiness which has been a major difficulty with plastisols. These mixtures are then sheeted out as on a sheeting mill or rubber calender to form layers of uniform thickness. The thickness of these layers will depend upon the thickness of the layers desired in the final article. The resulting sheets, or portions thereof having an area commensurate with that of the pre-molding cavity are then charged into such cavity using differently colored layers to achieve the effect desired in the final articles. The pre-molding cavity is substantially filled with the initial layers of stock. Pre-molding is most conveniently done with a heated platen press using a "frame mold" which is typically a closed rectangular metallic frame capable of withstanding the pressure generated in the pre-molding operation. Pre-molding is typically carried out at temperatures ranging from 250° F. to 350° F. while confining the mixture under such pressure as to prevent any substantial escape of the gas evolved by the blowing agent during pre-molding. Should a small amount of gas escape, for example at a corner of the frame mold, it may result in a slight distortion of the layers of stock adjacent the point of escape, necessitating discarding such distorted portion during the subsequent cutting operation.

If desired, I may provide a thick elastic gasket around the interior of the walls of the mold, which gasket is spaced from the upper platen of the press to allow escape of air and gas above the initial charge but is expanded vertically by the lateral pressure of the stock during the miniature molding step whereby to seal off the mold completely and prevent flash and escape of stock and of the gas generated in this step, as described and claimed in my copending application Serial No. 313,752, filed October 8, 1952, now U. S. 2,713,699. Use of such a gasket prevents any distortion of the layers of the stock.

After fusion, decomposition of blowing agent and partial curing have been achieved, the miniature article is cooled as by admitting cooling water to the platens of the press whereupon the mold is opened and the miniature object is removed. It is then heated under conditions of free expansion, typically at temperatures of the order of 300–350° F., to effect final expansion and cure. The degree of expansion brought about is usually equal to at least twice in each direction, corresponding to at least an eightfold volumetric expansion. The degree of expansion can be controlled by varying the amount and types of blowing agent and should be taken into account in calculating the size and proportions of the pieces of stock originally used and of the pre-molding cavity.

The vinyl resin will almost invariably be polyvinyl chloride or a resinous copolymer of a major proportion of vinyl chloride and a minor proportion of copolymerizable monomer containing an ethylenic group, e. g., vinyl acetate, vinylidene chloride, diethyl maleate, diethyl fumarate, etc. I prefer to use copolymers made from 85–95% vinyl chloride and 15–5% copolymerizable monomer. The vinyl resin should be completely compatible with the rubbery copolymer and should be capable of being dissolved by the plasticizer, upon heating to an elevated temperature, i. e., 300° F. or higher, to form a gel.

Any high-boiling organic liquid plasticizer capable of dissolving the vinyl resin upon heating can be used. The plasticizer should be compatible with the rubbery copolymer. It usually is an ester, ether or ketone. Examples of suitable plasticizers are dioctyl phthalate, dibutyl sebacate, dioctyl sebacate, linear polyester resin plasticizers such as those disclosed at Ind. Eng. Chem., 37, 504 (1945), for example "Paraplex G-50," and plasticizers made by introducing epoxy groups into a drying oil, e. g., soy bean oil, an example of the latter type being "Paraplex G-60."

I can use any rubbery copolymer of butadiene and acrylonitrile. These rubbery copolymers are commonly known as "Buna N." The combined acrylonitrile content generally ranges from 15 to 40%. Examples of suitable rubbery copolymers are those sold under the trade name "Paracril." I have also successfully used the copolymers sold as "Hycar OR-15" and "Chemigum."

The relative proportions of resin, plasticizer and rubbery copolymer can vary widely. Typically, I employ from 10 to 66% of the resin, from 10 to 60% of the plasticizer, and from 16 to 80% of the copolymer, these percentages being by weight based on the sum of these three ingredients alone and totaling 100%. These percentages are preferred because they give a product having the flexibility and compressibility desired in the shoe sole of the type contemplated.

For certain uses, where unusually good shock absorbing properties are desired in the final article, I can proportion the resin, plasticizer and rubbery copolymer in accordance with my copending application Serial No. 329,461, filed January 2, 1953, which discloses and claims the attainment of unusual shock absorbing properties by the use of from 42 to 66% of the resin, from 14 to 20% of the plasticizer and from 20 to 38% of the copolymer. Many, if not most, of the shoe soles made by my invention will have proportions other than these but for some applications the proportions just given will be employed.

As the chemical blowing agent, I prefer to use those which liberate nitrogen gas. Examples are dinitrosopentamethylenetetramine (sold as "Unicel ND"), alpha, alpha'-azobisisobutyronitrile, and p,p'-oxybis (benzene sulfonyl hydrazide) (sold as "Celogen"). The amount of the blowing agent used may vary widely depending upon the particular blowing agent employed and the proportion thereof used.

Any of the conventional vulcanizing agents, compounding agents, fillers, pigments, etc. commonly used in the rubber industry may be incorporated in the mixture. I generally prefer to employ sulfur as a vulcanizing agent in conjunction with known vulcanizing accelerators and activators. I may also include conventional anti-oxidants for the rubbery copolymer and known stabilizers for the resin.

My products are almost 100% of the closed-cell type. As a result, they show very little moisture absorption. This is highly advantageous in a shoe sole. Typically my products have a water absorption figure substantially less than 10% of their weight when they are submerged in water for 72 hours.

The density of my products is usually not over 15 pounds per cubic foot and often ranges from 9 to 12 pounds per cubic foot. The compressive resistance of my products is at least 0.8 pound per square inch at 25% compression and may range up to 20 pounds per square inch, often ranging from 6 to 16 pounds per square inch. In the typical practice of my invention, all layers of the laminate have a 25% compressive resistance of 6 to 16 p. s. i. and a density of 9 to 12 pounds per cubic foot. The compressive resistance, or yieldability, of the product can be controlled by varying the relative proportions of the three principal components and by adjusting the amount and type of vulcanizing agents for the copolymer.

A marked advantage of my material for shoe soling is the fact that relatively very high compressive resistance can be achieved at relatively low density. For example, by my invention I can make shoe soling having a 25% compressive resistance of 12 to 16 pounds per square inch and a density of 10 to 12 pounds per cubic foot.

After pre-molding is complete, the miniature pre-molded article should be cooled down to below 150° F. before opening the pre-molding press, in order to cause the miniature to have sufficient strength to retain the liberated gas. It will be understood that the gas evolved in the pre-molding step is under very high pressure, being either dissolved in the stock or maintaind therein in the form of very small bubbles or both, so that the stock must develop considerable strength in order to hold the gas.

It will be understood that my invention can be practiced with innumerable variations in the colors and arrangement of the differently colored layers. It will also be understood that my invention could in its broader aspects be practiced by placing in the pre-forming mold pieces of differently colored stock arranged in a different manner than that described above. For example, sections of differently colored stock having the thickness of the frame mold could be disposed therein whereby there would be obtained a laminate having the differently colored stripes appearing on the upper and lower surfaces thereof rather than at the edges thereof. Many other variations of my broad inventive concept will be apparent to those skilled in the art.

Although I have described my invention with particular emphasis on the method comprising a miniature pre-molding step followed by free expansion, I am not restricted to this method in the broader aspects of my invention but can use the method described and claimed in my copending application Serial No. 431,460, filed of even date herewith, in accordance with which the pre-molding under high pressure is eliminated. In applying the method of said application to the production of the multi-colored laminate of my invention, differently colored mixtures made as described herein but containing an ultra accelerator in amount equal to from 1 to 5 parts per 100 parts of butadiene-acrylonitrile rubbery copolymer are formed. These mixtures are sheeted out in the usual way (at room or only moderately elevated temperature), as by calendering or by extrusion, whereupon a plurality of layers of differently colored stock are placed in a mold (preferably a "frame mold") in such a way as to substantially fill the mold therewith, whereupon the plied-up assembly is subjected to pressure and moderate heat to mechanically knit the adjacent layers together. The conditions of time, temperature and pressure in the sheeting step are so adjusted that the desired consolidation of the mixture into sheet form takes place without decomposition of the blowing agent, fusion of the three main ingredients, or curing of the rubbery copolymer and the conditions in the pre-molding step are so adjusted that the desired knitting of adjacent layers together is achieved without decomposition of the blowing agent, without substantial fusion and with or without partial curing of the rubbery copolymer. The miniature plied-up assembly so obtained is removed without cooling the mold and heated at a temperature of at least 300° F. under conditions of free expansion to decompose the blowing agent, effect fusion of the resin, rubbery copolymer and plasticizer and complete the cure of the rubbery copolymer. The ultra accelerator partially cures the rubbery copolymer either in the pre-molding step or during the initial portion of the final expansion step.

When shoe soling is produced by the method just described, a tread design can be imparted to one side of the laminate by using a plate engraved in negative with the tread design in miniature on one face of the plied-up assembly during the pre-molding step.

Many advantages of my invention will be obvious to those skilled in the art. A very great advantage is that no cementing of the laminae is involved. Cementing would be highly objectionable because of the time required, because of the expense for cement, and because there would inevitably be areas of weakness causing separation. Another major advantage of my invention is that it eliminates the necessity of applying a striped edging or foxing to the sole and it eliminates the objections to such applied edging or foxing. With my material, the same attractive edge is presented to the eye regardless of where the stock is cut. In other words, the striping is an integral part of my sole and my soles are ready for use immediately after they are died-out. Another advantage of my invention is that any suitable non-skid tread design can be obtained by the use of a molding plate having such design in the forming operation.

The following are typical formulations which can be used in the practice of my invention. All parts are by weight.

| | Example | | |
|---|---|---|---|
| | I | II | III |
| | Color Other Than Black or White | White | Black |
| "Vinylite VYNW" (Copolymer of 95% vinyl chloride and 5% vinyl acetate) | 100 | 100 | 100 |
| Dioctyl Phthalate (plasticizer) | 30 | 30 | 30 |
| Dibutyl Sebacate (plasticizer) | 20 | | |
| Stabilizer for Vinyl Resin | 4 | 4 | 4 |
| Calcium Stearate | 2 | 2 | 2 |
| Stearic Acid | 1 | 1 | 1 |
| Zinc Oxide | 3 | 3 | 3 |
| Sulfur | 1 | 1 | 1 |
| Benzothiazyl Disulfide | 0.5 | 0.5 | 0.5 |
| Color Pigment (e. g., red, blue, green, etc.) | 6 | | |
| Titanium Dioxide | | 15 | |
| Blowing Agent (p,p'-oxybis (benzene sulfonyl hydrazide)) | 15 | 15 | 15 |
| Carbon Black | | | 5 |
| Buna N ("Hycar OR-15") | 100 | 100 | 100 |
| "Agerite Stalite" (Anti-oxidant, a mixture of mono- and diheptylated amines) | 1 | 1 | 1 |
| Total | 283.5 | | |

All of the above ingredients except the two plasticizers, the "Hycar" and the "Agerite Stalite" were dry blended in a Hobart mixer to a uniform mixture. The plasticizer was then added to this dry mixture and intimately incorporated therewith. The "Hycar" was banded on a cold rubber mill whereupon the "Agerite Stalite" was incorporated therewith on the cold mill after which the uniform blend which had been prepared in the Hobart mixer was incorporated with the "Hycar"-"Agerite Stalite" mixture on the cold mill. Milling was continued until a homogeneous dispersion was obtained. Care was taken to keep the temperature of the mixture below 180° F. to avoid fusion of the mixture and decomposition of the blowing agent. The mixture at this point contained the rubbery copolymer in the continuous phase with the resin, plasticizer and other ingredients in the discontinuous phase.

Differently colored mixes having the above formulation were sheeted out and converted into a multi-colored laminate in the manner described herein.

The formulation of Example I typically results in a product with a 25% compressive resistance of 6–8 p. s. i. and a density of about 9–10 pounds per cubic foot. The formulations of Examples II and III (containing a lower percentage of plasticizer) typically give products having a 25% compressive resistance of 12–16 p. s. i. and a density of about 10–12 pounds per cubic foot.

Where the two-stage expansion process is used, I may press cure the formulation of Example I for 20 minutes at 300° F. and may press cure the formulations of Examples II and III for 15 minutes at 315° F. If a laminate of Example I and Examples II or III is being prepared, intermediate conditions of time and temperature may be used. I may perform the final expansion of all three examples by heating the pre-molded laminates 20–30 minutes at 320–340° F. The formulations may be modified in order that press curing or final expansion or both may take place at considerably different times and temperatures from those stated.

The formulations of Examples I to III may alternatively be processed by the one-stage or low temperature pressing technique of my aforementioned application Serial No. 431,460 with substantially equivalent results.

Multi-colored laminates made from the formulations of Examples I to III, processed in either of the ways described above, can be died-out into shoe soles having great sales appeal and foot comfort.

Referring now to the drawings, three sheets 1, 2 and 3 of stocks prepared as described above in different colors, for example red, white and blue, respectively, are placed in a frame mold which is formed by the platens 4 and 5 of a press, rectangular frame 6 and tread design molding member 7 (upon which the tread design is engraved in miniature). The thickness and size of sheets 1, 2 and 3 is such that the mold cavity is substantially completely filled therewith when the press is closed. The press is closed and heat is applied to the platens to effect the pre-molding operation described above. The platens are then cooled to bring the stock down to a temperature approaching room temperature whereupon the pre-molded miniature sheet 8 is removed. Miniature sheet 8 is then expanded under conditions of free expansion in the manner described above to give final sheet 9 having the desired tread design. Shoe soles 10 are then cut from sheet 9 as indicated in Fig. 5. Tread surface 11 of sheet 9 and soles 10 can have any desired non-skid pattern, for example, a pattern embodying pyramidal projections 12, as shown in detail in Fig. 7. The final sheet 9 and soles 10 are characterized by the sharpness and straightness of the lines of demarcation between the adjacent differently colored sections and these same sharp straight lines of demarcation are apparent regardless of the portion of sheet 9 which is cut.

Having thus described my invention, what I claim and desire to protect by Letters Patent is:

1. A new article of manufacture comprising a flexible, resilient laminate of a closed-cell, expanded, vulcanized, fused mixture of a thermoplastic vinyl resin, a high-boiling organic liquid plasticizer therefor and a butadiene-acrylonitrile rubbery copolymer, said laminate comprising a plurality of parallel juxtaposed differently colored layers of said mixture integrally bonded together at their interfaces, said layers forming sharp straight lines of demarcation therebetween at exposed surfaces of said laminate transverse to said layers, all of said layers having a compressive resistance of at least 6 pounds per square inch and a density of not over 15 pounds per cubic foot.

2. An article of manufacture as set forth in claim 1 wherein the relative proportions of said resin, said plasticizer and said copolymer are equal to from 10 to 66% of said resin, from 10 to 60% of said plasticizer and from 16 to 80% of said copolymer, said percentages being by weight based on the sum of the weights of said three ingredients and totalling 100%.

3. As a new article of manufacture, a shoe sole comprising a flat flexible sheet of a closed-cell, expanded, vulcanized, fused mixture of a thermoplastic vinyl resin, a high-boiling organic liquid plasticizer therefor and a butadiene-acrylonitrile rubbery copolymer, said sheet comprising a plurality of parallel superimposed differently colored layers of said mixture integrally bonded together at their interfaces, said layers forming sharp straight lines of demarcation therebetween at the edges of said sheet, all of said layers having a 25% compressive resistance of from 6 to 16 pounds per square inch and a density of from 9 to 12 pounds per cubic foot.

4. A shoe sole as described in claim 3 wherein the relative proportions of said resin, said plasticizer and said copolymer are equal to from 10 to 66% of said resin, from 10 to 60% of said plasticizer and from 16 to 80% of said copolymer, said percentages being by weight based on the sum of the weights of said three ingredients and totalling 100%.

5. A shoe sole as recited in claim 3 having a tread face having a non-skid tread design molded therein and a smooth upper face.

6. The method which comprises forming a plurality of differently colored mixtures of a solid, shapable, non-sticky dispersion of a thermoplastic vinyl resin and a high-boiling organic liquid plasticizer therefor in a butadiene-acrylonitrile rubbery copolymer as the continuous phase, said mixtures including pigmenting material, a chemical blowing agent, and vulcanizing agents for said copolymer, sheeting out said mixtures, plying up layers of the differently colored sheets with differently colored layers adjacent to one another, and heating the plied-up assembly and effecting decomposition of the blowing agent and expansion of the mixtures to closed-cell cellular form, fusion of the resin, plasticizer and rubbery copolymer into a uniform homogeneous blend, and vulcanization of the rubbery copolymer, and thereby forming a laminate comprising a plurality of parallel juxtaposed differently colored closed-cell layers integrally bonded together at their interfaces and forming sharp straight lines of demarcation therebetween.

7. A method as set forth in claim 6 including the further step of cutting the laminated article prepared as defined in claim 6 transversely to the laminae thereof whereby an attractive surface having differently colored stripes with sharply defined lines of demarcation therebetween is obtained.

8. The method which comprises forming a plurality of differently colored mixtures of a solid, shapable, non-sticky dispersion of a thermoplastic vinyl resin and a high-boiling organic liquid plasticizer therefor in a butadiene-acrylonitrile rubbery copolymer as the continuous phase, said mixtures including pigmenting material, a chemical blowing agent, and vulcanizing agents for said copolymer, sheeting out said mixtures, plying up layers of the differently colored sheets with differently colored layers adjacent to one another, heating the plied-up assembly to an elevated temperature sufficient to decompose said blowing agent, fuse said resin, plasticizer and copolymer into a single phase, partially vulcanize said copolymer sufficiently to prevent escape of the gas evolved by said blowing agent and effect integral bonding of said layers at their interfaces without destroying the sharpness of the lines of demarcation therebetween, rigidly confining the assembly under positive mechanical pressure during said heating step, cooling the assembly while maintaining said pressure, removing the assembly from confinement, and heating it under conditions of free expansion to expand it to final form and complete the cure of said copolymer.

9. The method of making flexible, resilient, compressible shoe soles having sharply defined contrasting colored stripes extending completely around them which comprises forming a plurality of differently colored mixtures of a solid, shapable, non-sticky dispersion of a thermoplastic vinyl resin and a high-boiling organic liquid plasticizer therefor in a butadient-acrylonitrile rubbery copolymer as the continuous phase, said mixtures including pigmenting material, a chemical blowing agent, and vulcanizing agents for said copolymer, sheeting out said mixtures, plying up layers of the differently colored sheets with differently colored layers adjacent to one another, forming a non-skid tread design in miniature in an outer face of an outer ply, heating the plied-up assembly and effecting decomposition of the blowing agent and expansion of the mixture to closed-cell cellular form, fusion of the resin, plasticizer and rubbery copolymer into a uniform homogeneous blend, and vulcanization of the rubbery copolymer, and thereby forming a laminated sheet comprising a plurality of parallel juxtaposed differently colored closed-cell layers integrally bonded together at their interfaces with sharp straight lines of demarcation therebetween, and forming shoe soles from the resulting sheet by cutting it transversely to the laminations thereof.

10. The method of making flexible, resilient, compressible shoe soles having sharply defined contrasting colored stripes extending completely around them which comprises forming a plurality of differently colored mixtures of a solid, shapable, non-sticky dispersion of a thermoplastic vinyl resin and a high-boiling organic liquid plasticizer therefor in a butadiene-acrylonitrile rubber copolymer as the continuous phase, said mixtures including pigmenting material, a chemical blowing agent, and vulcanizing agents for said copolymer, sheeting out said mixtures, plying up layers of the differently colored sheets with differently colored layers adjacent to one another, heating the plied-up assembly to an elevated temperature sufficient to decompose said blowing agent, fuse said resin, plasticizer and copolymer into a single phase, partially vulcanize said copolymer sufficiently to prevent escape of the gas evolved by said blowing agent and effect integral bonding of said layers at their interfaces without destroying the sharpness of the lines of demarcation therebetween, rigidly confining the assembly under positive mechanical pressure during said heating step, molding a non-skid tread pattern in miniature into the outer face of an outer layer of the assembly during said heating step, cooling the assembly while maintaining said pressure, removing the assembly from confinement, heating it under conditions of free expansion to expand it to final sheet form and complete the cure of said copolymer, and forming shoe soles from the resulting sheet by cutting it transversely to the laminations thereof.

References Cited in the file of this patent
UNITED STATES PATENTS

| | | |
|---|---|---|
| 953,077 | Warner | Mar. 29, 1910 |
| 2,323,562 | Nugent | July 6, 1943 |
| 2,570,182 | Daly et al. | Oct. 9, 1951 |